United States Patent [19]
Holt et al.

[11] 3,956,516
[45] May 11, 1976

[54] PROCESS FOR MOLDING FOODSTUFFS

[76] Inventors: Michael George Holt, Rose Cottage, Nadderwater near Exeter, Devon; Denis Gordon Scott-Maxwell, Villa Franca, Tiverton, Devon, both of England

[22] Filed: Dec. 18, 1973

[21] Appl. No.: 425,816

[30] Foreign Application Priority Data
Dec. 19, 1972   United Kingdom............... 58525/72

[52] U.S. Cl. .................................... 426/420; 17/32; 17/45; 100/223; 425/89; 425/361; 425/444; 426/513

[51] Int. Cl.² ...................... A22C 7/00; B65B 25/08

[58] Field of Search ........... 426/513, 420, 393, 389, 426/414, 646, 645; 17/32, 45; 100/DIG. 10, 223; 99/349, 427; 425/89, 361; 53/122, 21 R

[56]               References Cited
            UNITED STATES PATENTS

| | | | |
|---|---|---|---|
| 1,757,447 | 5/1930 | Comstock | 17/32 |
| 1,808,993 | 6/1931 | Murray | 17/32 |
| 1,968,384 | 7/1934 | Gaunt | 17/32 |
| 2,185,174 | 1/1940 | Hendler | 17/32 |
| 2,366,379 | 1/1945 | Bemis | 17/32 |
| 2,452,218 | 10/1948 | Bemis | 17/32 |
| 2,554,821 | 5/1951 | Garfunkel | 17/32 |
| 2,641,094 | 6/1953 | Starzyk | 17/32 X |
| 2,981,973 | 5/1961 | Elmore | 426/513 X |
| 3,008,235 | 11/1961 | Royer et al. | 17/32 X |
| 3,623,188 | 11/1971 | Holly | 17/32 |
| 3,671,008 | 6/1972 | Villalba, Jr. | 17/32 X |

*Primary Examiner*—Frank W. Lutter
*Assistant Examiner*—Steven L. Weinstein
*Attorney, Agent, or Firm*—Morgan, Finnegan, Pine, Foley & Lee

[57]                ABSTRACT

This invention is concerned with machinery for handling and forming or molding sticky materials such as uncooked foods into patties or shaped cakes.

8 Claims, 3 Drawing Figures

U.S. Patent  May 11, 1976  3,956,516
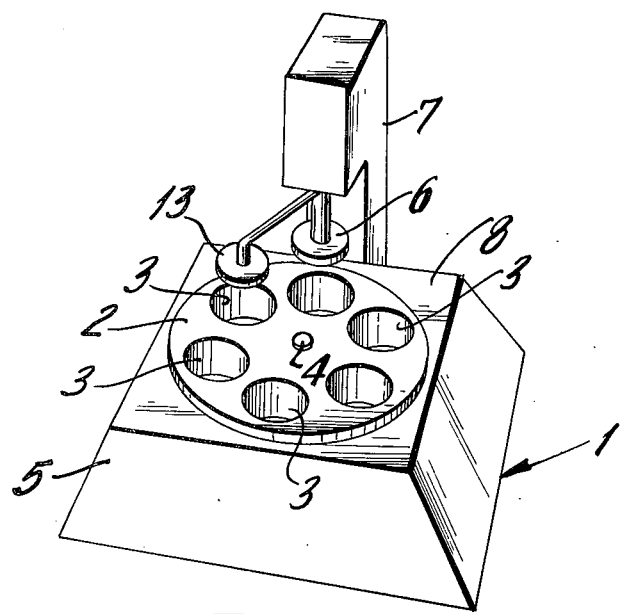
FIG. 1
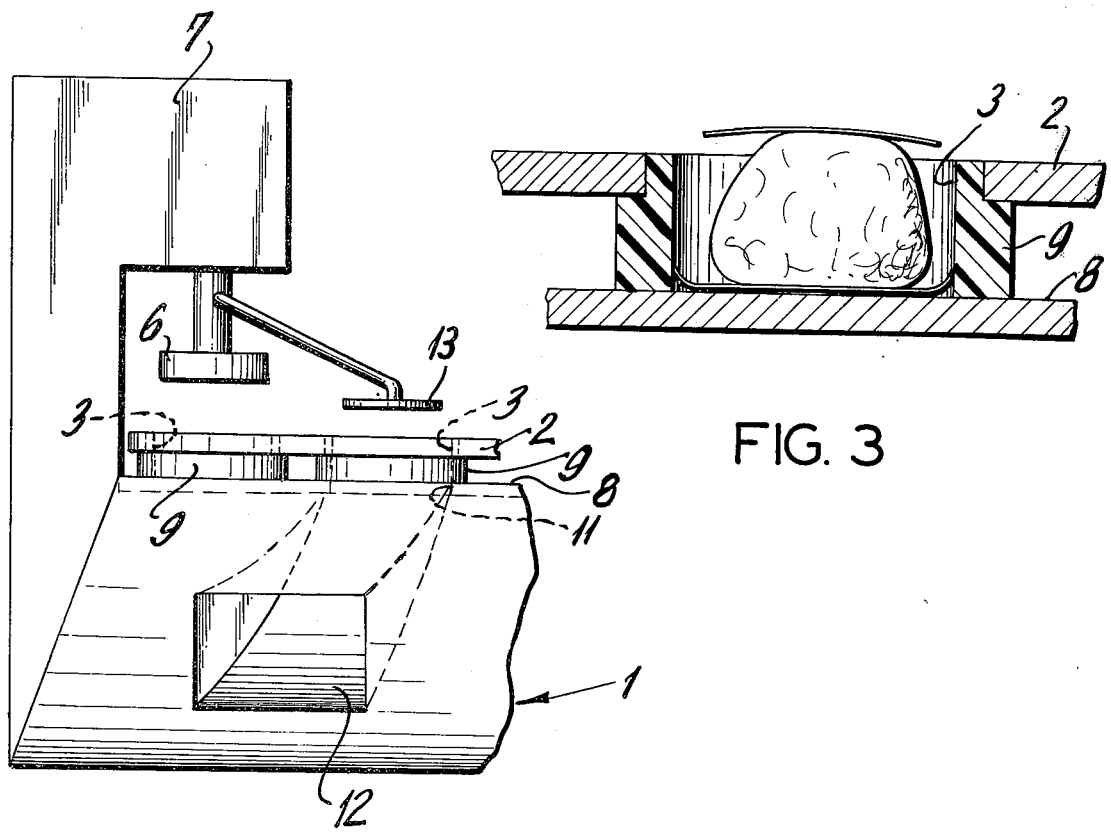
FIG. 2
FIG. 3

PROCESS FOR MOLDING FOODSTUFFS

BACKGROUND OF THE INVENTION

Machines are used for forming foodstuffs into shaped cakes or patties normally comprising processed uncooked materials composed of solids and liquids. These materials are prepared by breaking the solid constituents down into particles, mixing them together with any desired additives. The machine then performs a variety of operations to form the mix into the desired shape. In the case of beefburgers or meat patties, the raw meat is prepared by first mincing and adding special materials for such purposes as improving the color, improving the flavor, making the mix more cohesive, and imparting a measure of resistance to degradation.

It is important that these additives should remain evenly distributed throughout the mix and not concentrated in any particular part of the formed shape. For example, if the flavoring is brought to the surface, an undesirable concentration will come into contact with the consumer's palate thereby effectively altering the desired taste.

SUMMARY OF THE INVENTION

This invention relates to machinery for handling and forming portions of sticky materials such as uncooked foods, for example, minced meat, with or without additives, or fish or cake mixes, or vegetable matter mixed with either meat or fish, where there are normally problems caused by the material adhering to the machinery during, for example, the wiping action of the machinery where a surface of the machine is brought in contact with one or other of the constituents of the material being molded. These problems are particularly emphasized in the forming of minced meat containing additives to make what are known as beefburgers, hamburgers, or steakettes.

The object of the present invention is to eliminate all of these undesirable effects by the insertion of a suitable membrane such as prepared unabsorbent paper, or plastic film, or foil, between the material being handled and any surface of the machine where there is a sliding movement of the product with the machine surface, either relative to the other. The membrane remains stationary relative to the food product being handled, but allows a sliding movement between the membrane and the machine surface. This membrane may subsequently be retained as a separator between the formed shapes of material and a sliding surface in subsequent handling operations. Thus it becomes possible to move the material across the surfaces of the machine or to move a surface of the machine across the foodstuff without incurrng the undesirable effects described.

BRIEF DESCRIPTION OF THE DRAWINGS

FIG. I generally shows a view of one embodiment of the invention comprising a housing containing an electrical drive and various mechanical devices, a circular rotatable plate having holes therein and a pillar and cantilever positioned above the circular rotatable plate.

FIG. II is a cross-sectional view of the upper portion of the machine housing which shows the ejecting plunger or cantilever positioned above the hole and cavity and the chute under the cavity which leads out the side of the housing.

FIG. III is an enlarged cross-sectional view of a cavity below the plate and formed by sides or walls extending down from the hole in the plate and a bottom which is the top surface of the base of the machine. The cavity contains the foodstuff sandwiched between the two membrances prior to being pressed into its final shape.

DETAILED DESCRIPTION OF THE PREFERRED EMBODIMENT

An embodiment of the invention is shown in the attached drawings in which (1) is a base and housing for an electrical drive and indexing mechanism (5) which indexes the position of the holes (3) in a circular rotatable plate (2) mounted on a vertical spindle (4) driven by the indexing mechanism (5). The holes (3) contain inserts (9) made of a suitable material such as polypropylene and the base of these inserts rest on the surface (8) of the housing (1). Fitted to the back of the housing (1) is another vertical housing in the form of a pillar and cantilever which houses a mechanism (7) for operating the plunger (6) in timed phase with the indexing mechanism (5) so that the plunger can enter by a selected variable amount the hole (3) and press any material which is contained in the cavity formed by the liner (9) and plate (8). A hole (11) in the surface of the housing leads to a chute with an opening at the side of the housing (12). The hole (11) is positioned directly under one of the holes (3) when an adjacent hole (3) is directly under the plunger (6).

The sequence of operations is as follows:

A disc of the membrane material similar to or slightly larger than the internal diameter of the insert (9) is placed in the cavity so that it rests on the surface (8) with its edges curled up the walls of the insert (9). A prepared and measured portion of material is then placed in the cavity so that it rests on the membrane and a second membrane is placed on top of the foodstuff. The indexing mechanism then rotates the plate (2) through sixty degrees in which position the plate (2) stops and another cavity can be loaded with membranes and foodstuff material. The plate (2) is then indexed through a further sixty degrees in an anticlockwise direction, when it again stops and the next cavity is loaded with membranes and material. There are six holes (3) in the plate (2) and a sequence occurs whereby the plate is in motion for a certain time while being indexed forward, then stationary for an equal time while the plunger (6) enters and withdraws from the hole (3) and a cavity is loaded with membranes and foodstuff material. This sequence is continuously carried out until the motive power to the machine is withdrawn. The mechanism is so timed that each hole or cavity containing its membranes and portion of foodstuff will in turn be indexed under and stop directly below the plunger (6). The plunger, while the cavity is stationary below it, moves down to a pre-selected level and presses the foodstuff against the bottom plate (8) and the internal walls of the liner (9) and in so doing forms the portion of the material into the desired shape. The plunger (6) is then withdrawn from the cavity and the plate (2) is indexed forward another sixty degrees so that the cavity containing the completed shape of material stops over the hole (11) leading into the chute. A presser (13) mounted on the plunger shaft then descends and ejects the material down the chute.

It will be appreciated that the invention is not restricted to the example, embodiment and application described and one skilled in the art will discern many applications in the forming, molding and handling of sticky materials in measured portions.

What is claimed is:

1. A process for forming one or more pre-measured portions of sticky foodstuff materials into cohesive shaped masses in a continuous manner which comprises the steps of sequentially advancing from a loading position to a forming position, relative to a supporting surface, forming means for said pre-measured portions having internal sidewalls having a configuration defining the desired shape for said portions, and being open at the top and bottom for passage of said portions into and out of said forming means, inserting a lower separating means into said forming means against said supporting surface, at said loading position, placing a pre-measured portion of said sticky material onto said separating means in said forming means and causing said separating means to serve as a protective barrier between said sticky material and said supporting surface, at said forming position, pressing said pre-measured portion of sticky material into a cohesive mass and conforming said mass to the wall configuration of said forming means, ejecting said cohesive shaped mass from said forming means through the open bottom thereof by using gravitational force by removing said supporting surface therefrom, and while performing said sequential operation, causing said separating means and said supporting surface to slide in contact with and relative to each other while causing such separating means to remain stationary relative to said sticky material thereby causing said sticky material and supporting surface to slide relative to each other without said material sticking or adhering to said surface.

2. The process of claim 1 wherein said ejecting step comprises pushing from the open top of said forming means and out through the open bottom thereof said cohesive shaped mass together with said lower separating means.

3. The process of claim 1 which further comprises causing said separating means to line at least a portion of the sidewall of said forming means and causing it to serve as a protective barrier between said sticky material and said sidewall.

4. The process of claim 1 wherein the step of removing said supporting surface is accomplished by advancing said forming means to an ejecting position defined by the absence of said supporting surface.

5. The process of claim 4 which further comprises the step of sequentially advancing said forming means from said ejecting position back to said loading position for reuse.

6. The process of claim 4 which further comprises placing upper separating means onto the exposed surfaces of said pre-measured portions of material in said forming means and causing said upper separating means to serve as a protective barrier for said material during and subsequent to pressing.

7. The process of claim 4 wherein said advancing steps comprise sequentially advancing a plurality of said forming means adapted for individual use with said pre-measured portions of material in a cyclical manner from said loading position to said forming position, then to said ejecting position and back to said loading position, and individually indexing said plurality of forming means at each of said positions.

8. The process of claim 7 which further comprises placing upper separating means onto the exposed surfaces of said pre-measured portions of sticky material in said forming means and causing said upper separating means to serve as protective barriers for said portions of material during and subsequent to pressing, and wherein said ejecting step further comprises pushing from the open top of each of said forming means and out through the open bottom thereof said cohesive shaped mass together with said lower and upper separating means.

* * * * *